(12) United States Patent
Brandt

(10) Patent No.: US 8,299,374 B2
(45) Date of Patent: Oct. 30, 2012

(54) PRECISION DYNAMIC MEASUREMENT APPARATUS

(76) Inventor: Robert O. Brandt, Wilmington, NC (US)

( * ) Notice: Subject to any disclaimer, the term of this patent is extended or adjusted under 35 U.S.C. 154(b) by 360 days.

(21) Appl. No.: 12/658,288

(22) Filed: Feb. 9, 2010

(65) Prior Publication Data

US 2011/0192654 A1 Aug. 11, 2011

(51) Int. Cl.
*G01G 13/18* (2006.01)
*G01F 1/30* (2006.01)

(52) U.S. Cl. ......... 177/1; 177/105; 177/116; 73/861.73; 251/326; 222/77

(58) Field of Classification Search ............... 73/861.73; 177/105, 116, 1; 222/55, 56, 77; 141/83; 251/326
See application file for complete search history.

(56) References Cited

U.S. PATENT DOCUMENTS

| | | | | |
|---|---|---|---|---|
| 3,298,745 A * | 1/1967 | Czapiewski | .................... | 298/37 |
| 3,557,847 A | 1/1971 | Hebel et al. | | |
| 4,353,312 A * | 10/1982 | Brouwer | ..................... | 105/241.2 |
| 4,354,622 A * | 10/1982 | Wood | .............................. | 222/55 |
| 5,219,031 A * | 6/1993 | Brandt, Jr. | ..................... | 177/145 |
| 5,230,251 A * | 7/1993 | Brandt, Jr. | ................. | 73/861.72 |
| 5,986,553 A | 11/1999 | Young | | |
| 6,094,994 A * | 8/2000 | Satake et al. | ................ | 73/861.73 |
| 6,679,125 B1 * | 1/2004 | Brandt, Jr. | .................. | 73/861.74 |
| 6,732,597 B1 * | 5/2004 | Brandt, Jr. | .................. | 73/861.73 |
| 6,769,462 B2 | 8/2004 | Larson et al. | | |
| 7,369,230 B1 | 5/2008 | Rogers | | |
| 7,663,067 B2 * | 2/2010 | Hayakawa et al. | ......... | 177/25.18 |
| 7,893,366 B2 * | 2/2011 | Gaalswyk | ...................... | 177/116 |
| 8,015,884 B1 * | 9/2011 | Carr et al. | ................... | 73/861.73 |
| 2005/0145419 A1 * | 7/2005 | Deters et al. | ................... | 177/105 |

* cited by examiner

*Primary Examiner* — Randy W Gibson
(74) *Attorney, Agent, or Firm* — MacCord Mason PLLC

(57) ABSTRACT

A method and apparatus are described for accurately measuring the weight of a moving stream of particulate material at different flow volumes. The apparatus includes a dynamic measurement device with a deflectable curved pan for measuring the amount of material flowing along a pathway; a supply source for discharging material along the pathway; and a gate valve having an inclined gate member with a leading edge controlling the volume of material discharged from the supply source, the valve reducing the height of discharge of the material above the dynamic measurement device proportional to the increase in the flow volume of material being discharged. A gate valve is also described that includes a gate member with a fully open position and a fully closed position, the valve aperture being open a width determined by the bridging characteristics of the particulate material being discharged when the gate member is in the fully closed position.

19 Claims, 3 Drawing Sheets

Graph 1

PRECISION DYNAMIC MEASUREMENT APPARATUS

BACKGROUND OF THE INVENTION (1) Field of the Invention

The present invention relates to a method and apparatus for accurately measuring the weight of particulate material moving along a pathway at different flow rates, and in particular to a method and apparatus for precisely measuring the amount of particulate material moving along a pathway as the volume of material changes.

(2) Description of the Prior Art

Numerous solid particulate materials are packaged in various types of containers for sale to the ultimate consumer or to a downstream processor. A brief exemplary listing of such materials include plastic and metal components and parts; food items, such as cereals, corn meal, rice, spices, soybeans, and potato chips; and a variety of other materials, such as tobacco, plastic pellets, etc.

Generally, the material is fed as a continuous or discontinuous feed from a bulk supply source, such as a hopper, directly into the containers, intermediate collection hoppers, or directed to other processing stages. The apparatus normally includes a means for weighing the material at some point. Control of the feed rate is used not only for material packaged by weight, but also for items packaged by the number of items, since these latter items are frequently packaged on the basis of the weight of the number of items in a container, as opposed to counting the number of items packaged. Desirably, the weight of the material is determined while the material is moving, instead of stopping the process. Dynamic measurement devices are used for this purpose in which the force of the moving material against a surface is used to calculate the weight and other properties of the material.

Particularly suitable dynamic measurement devices are described in earlier U.S. Pat. No. 5,219,031, issued Jun. 15, 1993, U.S. Pat. No. 5,230,251, issued Jul. 27, 1993, and U.S. Pat. No. 6,679,125, issued Jan. 20, 2004, all to the present inventor, these patents being incorporated herein by reference in their entireties. Generally, the dynamic measurement device described in these patents is comprised of a curved weigh pan having inlet and outlet ends, and an inwardly curved surface extending between the pan ends. The pan is positioned to receive a continuous stream of solid particulate material tangentially at the inlet end, i.e., the material stream is directed substantially perpendicular to the radius of curvature of the pan at the upper end. As a result, the material flows around the curved surface of the pan without impacting the pan, eliminating errors due to the movement of the pan under impact forces.

The pan is mounted on the distal end of an elongated support arm, with the proximal end of the arm being attached to a suitable support at a distance from the pan. To permit pan displacement, the arm is either flexible or is pivotally attached at its proximal end. When material flows over the inwardly curved pan, an inward centripetal force, and a corresponding outward force, is exerted causing the pan to move outwardly. This outward movement, corresponding to the weight, or change in weight, of the material moving across the pan is measured by the displacement measurement instrument. A displacement measurement instrument, such as a transducer, is positioned to continuously measure the displacement of the pan. Thus, a dynamic measurement device is capable of measuring variations in the amount of material moving along a given pathway without interrupting the flow of material.

Since the outward force exerted against the pan is due entirely to the centripetal force, and is independent of any impact or frictional forces, measurement is highly accurate, and can be measured instantaneously and continually. For optimal measurement independent of non-centripetal force factors, the pivot point of the arm is preferably located so that a line extending from the arm to the pan approximately midway between the pan inlet and outlet ends is perpendicular to the radius of curvature of the pan. The dynamic measurement device is positioned to receive material falling tangentially along the inner surface of the pan at its inlet end.

Centripetal force is the inward force required to keep an object moving in a circular path. It can be shown that an object moving in a circular path has acceleration toward the center of the circle along a radius. This radial acceleration, called the centripetal acceleration, is such that, if an object has a linear or tangential velocity when moving in a circular path of radius R, the centripetal acceleration is $V^2/R$. If the object undergoing the centripetal acceleration has a mass M, then by Newton's second law of motion, the centripetal force Fc is in the direction of acceleration. This is expressed by the formula: $F=MV^2/R$, where F is the force exerted against the pan by the moving material, M is the mass of the material being measured, V is the velocity of the material as it crosses the pan, and R is the radius of curvature of the pan surface.

While the above apparatus works extremely well in most applications, it has been found that calibration may be required where there is a significant increase in the flow rate of the material being measured. Accordingly, there is a need for a means for automatically adjusting apparatus of the above type to take into consideration the flow rate of the material being conveyed.

SUMMARY OF THE INVENTION

Generally, it has been found that the force reading becomes inaccurate at high flow rates of some materials due to the fact that the radius in the above formula, instead of being the surface of the pan, becomes the surface of the material being conveyed across the pan. As a result, the R denominator in the formula $F=MV^2/R$ becomes smaller, resulting in a higher F or force reading.

In accordance with the present invention, it has been found that this deviation can be corrected without recalibration by decreasing the height of the discharge opening above the entry end of the pan as the flow increases. Decreasing the height results in a proportional decrease in the velocity of the material as the material travels across the pan. As a result, V for velocity in the above formula is decreased, resulting in a corresponding decrease in F to compensate for the smaller R.

It has also been found that this decrease in height with a corresponding increase in material flow rate can be accomplished through the use of a gate valve having an inclined gate member. The gate member is slidable across the valve opening or aperture between a closed position and an open position. As the gate member is moved toward the open position, the leading edge of the gate member moves away from the side of the aperture defined by the valve housing, increasing the size of the aperture opening or gap, thereby permitting an increased flow of material from the hopper or other supply source. At the same time, the height of the aperture opening, which is determined by the leading edge of the gate member is lowered. As a result, the material has a shorter distance to fall before reaching the pan upper edge, and thus moves across the pan at a lower velocity.

In the measurement of some materials, the gate member will entirely close the aperture when in the closed position, i.e., the gate member leading edge will extend completely across the aperture, or even beyond into a slot in the valve housing. However, in some instances, it has also been discovered that significant advantages result from leaving a small gap between the leading edge of the gate member and the aperture wall.

More specifically, when dispensing frangible particulate materials, such as cereals and potato chips, complete closure of the aperture will crush material caught between the valve housing and the gate member leading edge. When the aperture is again opened, the crushed particles are included in the material stream, diminishing the quality of the product.

By leaving the aperture slightly open, however, no crushing occurs. However, if the gap between the gate member leading edge and aperture wall is small, discharge of material will stop due to bridging of the material across the gap. Bridging, also known as arching or doming, is the characteristic of particulate materials to interlock when the particles are large relative to the opening, resulting in a bridge being formed across the gap due to the bonding between the particles. By utilizing this characteristic, normally considered to be a problem in dispensing of particulate materials, it is possible to effectively halt the flow of particulate material without damage to the material.

The maximum width of the gap, i.e., the distance between the gate member leading edge and the aperture wall, that is required to create bridging of the particulate material will depend on the characteristic particle dimension of the material being dispensed. Generally, however, a width of less than about four times the characteristic particle dimension of the material is sufficient to halt the material flow.

Combining the above components, a preferred embodiment of the present invention is comprised of a hopper or other material supply source with a discharge conduit, a valve with an inclined gate member in communication with the discharge opening, and a dynamic measurement device with a deflectable weigh pan positioned beneath the valve. An actuator is used to control the position of the valve with a measurement device to determine the valve position.

The valve includes a housing with a discharge opening or aperture defined by side walls, a slidable gate member having a closed position in which the aperture is completely or substantially closed, i.e., a small gap of predetermined width remains between the gate member leading edge and the aperture wall, and an open position in which the aperture is completely opened. The gate member is inclined so that the gate member leading edge moves downward as the aperture is opened, effectively lowering the position of the aperture relative to the measurement device. The valve also includes an actuator to control the position of the gate member.

The dynamic measurement device includes an inwardly curved weigh pan having inlet and outlet ends positioned to receive a continuous stream of solid particulate material tangentially at the inlet end. The pan is mounted on the distal end of an elongated, moveable support arm that is in communication with a displacement measurement means to measure the deflection of the pan due to the centripetal force of the material flowing over the pan.

DETAILED DESCRIPTION OF THE INVENTION

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

Figure 1:
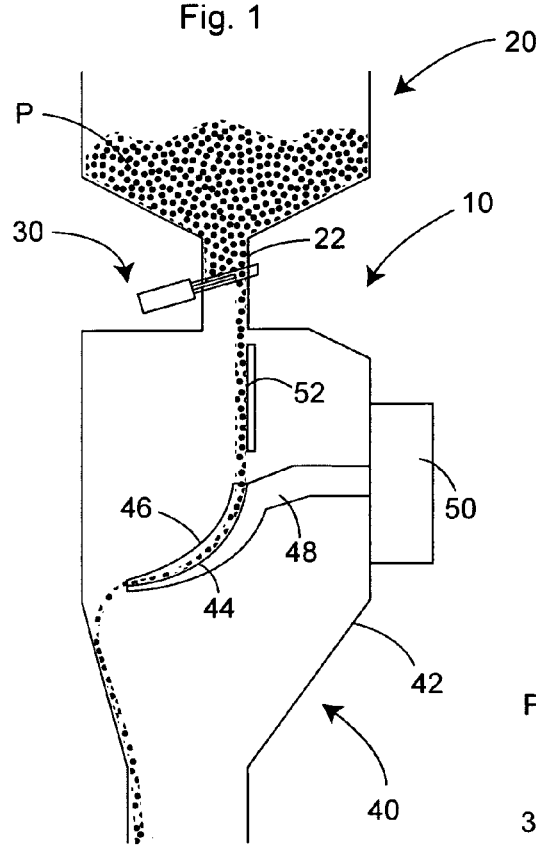
FIG. 1 is a sectional side view of the present apparatus illustrating flow of particulate matter at a first flow rate.
Figure 2:
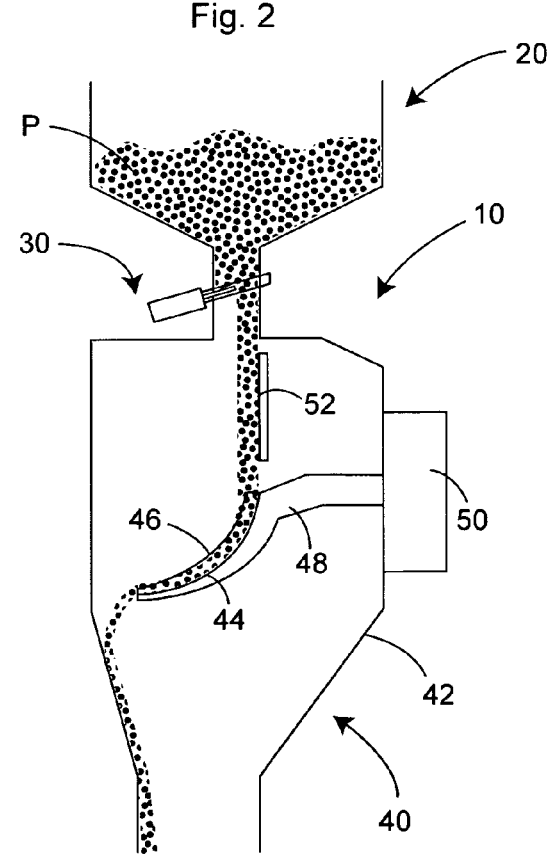
FIG. 2 is a sectional side view of the present apparatus illustrating flow of particulate matter at a second flow rate greater than the first flow rate.

As best illustrated in FIGS. 1 and 2, the dispensing apparatus, generally 10, of the present invention is comprised of a hopper 20 having a discharge conduit 22, a gate valve 30 in communication with discharge conduit 22, and a dynamic measurement device, generally 40.

Valve 30 is comprised of a housing 32 having an aperture 34, a gate member 36, and a valve actuator 38 to position gate member 36 at selected positions across aperture 34. Aperture 34 includes rear and front walls, 41 and 42 respectively. Gate member 36 is inclined upwardly toward front wall 38. In most instances, the gate member will be inclined at an angle of from about 1° to about 20° above horizontal.

Dynamic measurement device 40 is comprised of a housing 42, a curved pan 44 with side walls 46, a support arm 48 supporting curved pan 44, and a transducer or other displacement measurement means 50 to measure the force exerted against pan 44. A guide plate 52 may also be included to guide particulate material P along a pathway to the upper end of pan 44.

FIG. 1 illustrates dispensing of particulate material P at a first flow volume, while FIG. 2 illustrates dispensing of particulate material P as a second flow volume greater than the first flow volume. Flow volume is increased by opening gate valve 30, i.e., by sliding upwardly inclined gate member 36 toward the fully open position. It will be noted from the illustrations, that the level of particulate material P on curved pan 44 increases as the flow volume increases.

As explained in detail in the U.S. Pat. Nos. 5,219,031; 5,230,251 and 6,679,125, the force exerted on pan 44 is a function of $MV^2/R$, where M is mass, V is velocity of the particulate material as it contacts pan 44, and R is the radius of curvature of pan 44. With a significant buildup of material on the pan, however, the radius of curvature is more accurately R', measured from the surface of the material P on pan 44 instead of the surface of pan 44 itself. As will be observed from FIGS. 1 and 2, thickness of material P on pan 44 increases with increased flow.

Figure 7:
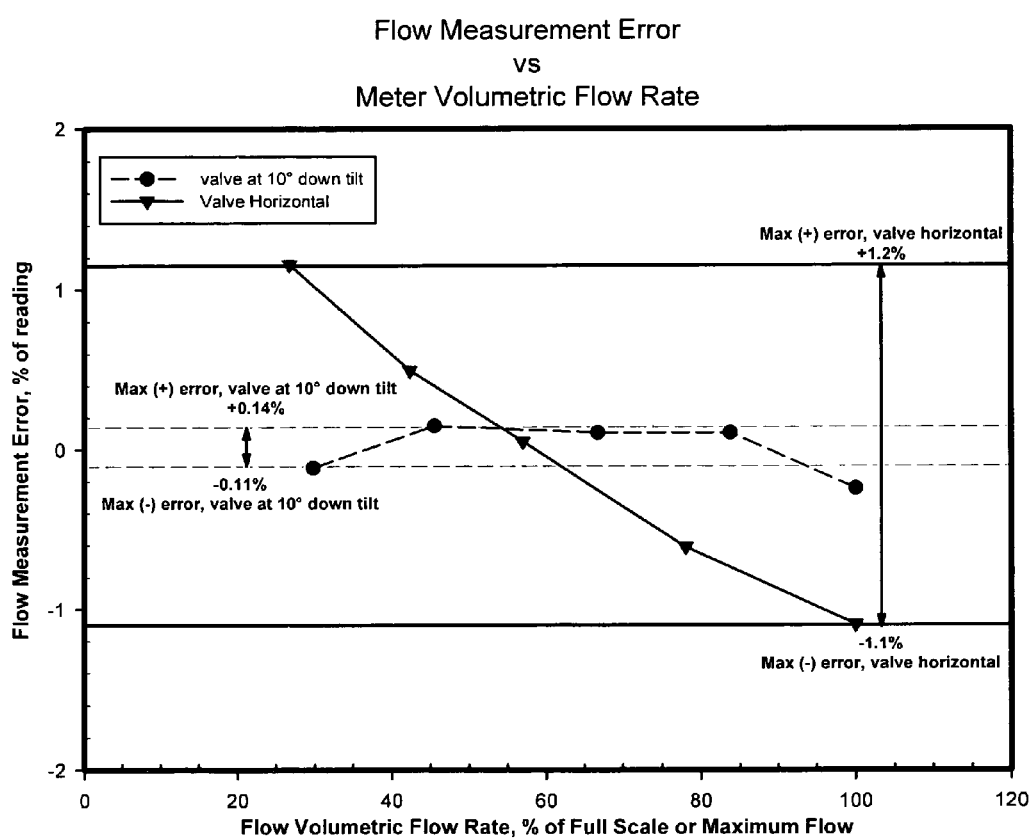
FIG. 7 is a graph illustrating the effect of the inclined gate member in comparison to a conventional horizontal gate member.

However, it has been determined that this variation in radius can be compensated for without recalibration of the flow meter by changing the drop height of material P onto the inlet end of pan 44, i.e., a reduction of R' in the formula $F=MV^2/R'$ is compensated for by a corresponding reduction in V. V is reduced by reducing the drop height of material P, since a shorter drop height will result in a lower velocity. FIG. 7 graphically illustrates the reduction on flow measurement error using a gate member that is inclined downwardly at 10°.

Figure 3:
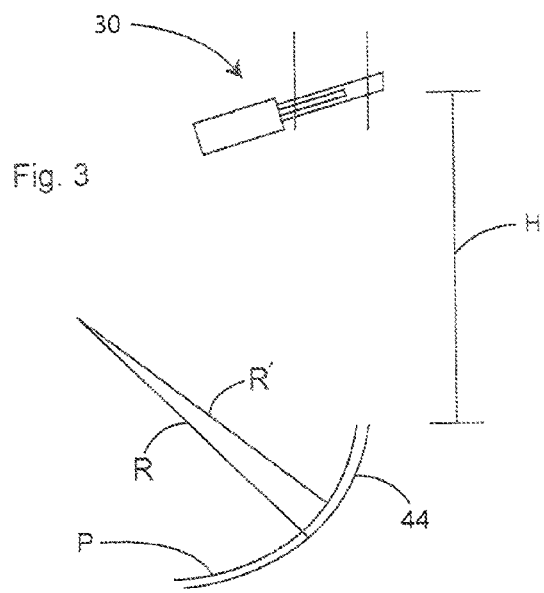
FIG. 3 is a schematic illustration showing the measurement of height and radius.
Figure 4:
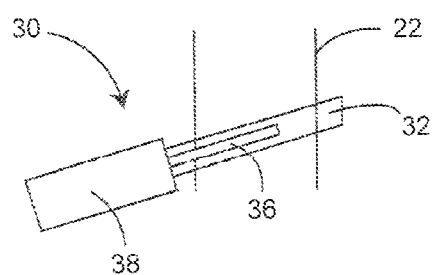
FIG. 4 is a sectional side view of a gate valve with an inclined planar gate member.

As seen in FIG. 3, drop height H is the distance from the lower edge of the valve aperture opening or gap, which is defined by the leading edge of gate member 36. Since gate member 36 is inclined, opening of gate member 36 not only increases flow, but also lowers the drop height by moving the leading edge of gate member 36 downwardly.

Figure 5:
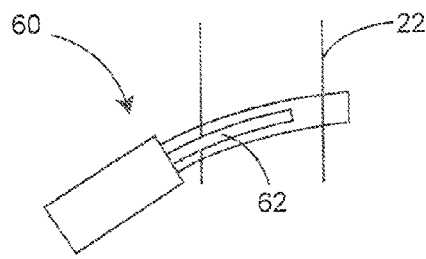
FIG. 5 is a sectional side view of a gate valve with an inclined curved gate member.

FIG. 3 illustrates a gate valve, generally 30, with an inclined planar gate member 36. This valve configuration will be sufficient for most applications. However, in instances where more accuracy is required, a curved gate valve such as shown in FIG. 5 may be used. Gate valve 60 shown in FIG. 5 differs from gate valve 30 in that inclined gate member 62 is downwardly curved. As a result, opening of gate valve 60 a given amount increasing flow by the same amount as valve 30 produces a correspondingly greater lowering of the drop height, and thereby the velocity.

Figure 6:
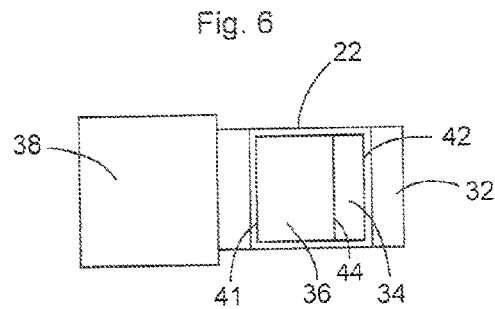
FIG. 6 is a sectional top view of a gate valve.

FIG. 6 is a top view showing the aperture opening or gap 34 between the front wall 42 of valve housing 32 and the leading edge 44 of gate member 36. As noted earlier, complete closing of gap 34 is undesirable when dispensing frangible materials such as cereal flakes and potato chips, which will be crushed between wall 42 and edge 44. Instead, it has been found that the discharge of material can be effectively stopped without crushing the material by leaving a gap 34 in the closed position that is sufficiently narrow to cause bridging of material P.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. An apparatus for accurately measuring the weight of a stream of particulate material at different flow volumes comprising:
   a) a dynamic measurement device for measuring the amount of material flowing along a pathway;
   b) a particulate material supply source; and
   c) a dispensing valve simultaneously controlling the volume of material discharged from the supply source and the height of discharge of the material above the dynamic measurement device, said valve decreasing the height as the volume of material discharged is increased.

2. The apparatus of claim 1, wherein the valve has an aperture and a downwardly inclined gate member with a leading edge adapted for sliding movement across the aperture to selected positions between a fully open position and a fully closed position.

3. The apparatus of claim 1, wherein, the dynamic measurement device includes a weigh pan having an inwardly curved surface and means for continually measuring the force of particulate material moving across the pan.

4. The apparatus of claim 1, wherein the supply source is a hopper with a discharge conduit, the valve being in communication with the hopper discharge conduit.

5. The apparatus of claim 2, wherein the gate member is downwardly curved from its leading edge.

6. An apparatus for accurately measuring the weight of a moving stream of particulate material at different flow volumes comprising:
   a) a dynamic measurement device for measuring the amount of material flowing along a pathway;
   b) a particulate material supply source; and
   c) a gate valve having an inclined gate member with a leading edge controlling the volume of material discharged from the supply source, the valve reducing the height of discharge of the material above the dynamic measurement device proportional to the increase in the flow volume of material being discharged.

7. The apparatus of claim 6, wherein the supply source is a gravimetric hopper with a discharge conduit, the valve being in communication with the conduit.

8. The apparatus of claim 6, wherein the dynamic measurement device includes a deflectable weigh pan having an inwardly curved surface, and inlet end and an outlet end, the material being directed tangentially onto the pan at the pan inlet end, and measurement means for measuring the deflection of the pan due to the force exerted by the material on the pan.

9. The apparatus of claim 6, wherein, the gate member is downwardly curved.

10. The apparatus of claim 6, wherein the gate valve has an aperture, the aperture remaining partially open when the gate valve is fully closed, whereby flow of particulate material is prevented by the bridging of the particulate material across the aperture.

11. The apparatus of claim 6, wherein the pathway includes an inwardly curved section, an inlet end and an outlet end, the distance from the leading edge of the gate member to the upper edge of the curved section decreasing as the gate valve is opened.

12. A method of accurately measuring the weight of a stream of particulate material at different flow volumes comprising:
   a) discharging a stream of particulate material having a given volume from a supply source at a given height onto a deflectable surface;
   b) simultaneously decreasing the given height as the given volume of the material is increased.

13. The method of claim 12, whereby decreasing the given height decreases the velocity of the particulate material.

14. The method of claim 12, wherein the deflectable surface is an inwardly curved pan having an inlet end and an outlet end, the material falling onto the pan tangentially at the pan inlet end.

15. The method of claim 12, wherein the material is discharged from a gate valve having an inclined gate member with a leading edge, the edge of the gate member being lowered as the gate valve is opened to increase the given volume.

16. The method of claim 12, wherein the surface is inwardly curved, and the given height is lowered proportional to the given volume such that F in the formula $F=MV^2/R'$ remains substantially constant, wherein M is the mass of the material, V is the velocity of the material, and R' is the radius of curvature to the surface of material on the curved surface.

17. An apparatus for accurately measuring the weight of a stream of particulate material at different flow volumes comprising:
   a) a dynamic measurement device for measuring the amount of material flowing along a pathway, said dynamic measurement device including a weigh pan having an inwardly curved surface and means for continually measuring the force of particulate material moving across the pan;
   b) a particulate material supply source; and
   c) a dispensing valve simultaneously controlling the volume of material discharged from the supply source and the height of discharge of the material above the dynamic measurement device.

18. The apparatus of claim 6, wherein the gate member has a leading edge adapted for movement across the aperture between a fully open position and a fully closed position, the aperture being partially open a predetermined width when the gate member is in the fully closed position; the predetermined width being determined by the bridging characteristics of the particulate material being discharged.

19. The apparatus of claim 18, wherein the predetermined width is up to about 4 times the characteristic particle dimension of the particulate material being discharged.

* * * * *